United States Patent
Duan

(10) Patent No.: US 10,703,218 B2
(45) Date of Patent: Jul. 7, 2020

(54) SYSTEM AND METHOD FOR SELECTING CONVERTERS TO PASS NON-ZERO CURRENT IN DISTRIBUTED CONVERTER SYSTEM

(71) Applicant: FORD GLOBAL TECHNOLOGIES, LLC, Dearborn, MI (US)

(72) Inventor: Xiaohong Nina Duan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/054,045

(22) Filed: Aug. 3, 2018

(65) Prior Publication Data

US 2020/0039358 A1 Feb. 6, 2020

(51) Int. Cl.
| | | |
|---|---|---|
| H02J 7/00 | (2006.01) | |
| B60L 53/22 | (2019.01) | |
| H02M 7/48 | (2007.01) | |
| H02J 7/35 | (2006.01) | |
| H02M 3/155 | (2006.01) | |
| B60L 58/12 | (2019.01) | |

(52) U.S. Cl.
CPC ............... B60L 53/22 (2019.02); B60L 58/12 (2019.02); H02J 7/007 (2013.01); H02J 7/0068 (2013.01); H02J 7/35 (2013.01); H02M 3/155 (2013.01); H02M 7/48 (2013.01)

(58) Field of Classification Search
CPC ............. Y02E 60/12; G01R 31/3648; G01R 31/3651; G01R 31/3624; H02J 7/0047
See application file for complete search history.

(56) References Cited

U.S. PATENT DOCUMENTS

| 5,625,272 | A | 4/1997 | Takahashi | |
|---|---|---|---|---|
| 6,034,507 | A * | 3/2000 | Ikawa | H02J 3/32 320/136 |
| 7,489,106 | B1 | 2/2009 | Tikhonov | |
| 8,854,008 | B2 | 10/2014 | Liu et al. | |
| 9,114,723 | B2 | 8/2015 | Bissontz | |
| 9,570,999 | B2 | 2/2017 | Yang et al. | |
| 9,825,474 | B2 | 11/2017 | Tohara et al. | |

(Continued)

FOREIGN PATENT DOCUMENTS

DE 102013210293 A1 12/2014

OTHER PUBLICATIONS

Anderson, R. Dyche, et al. Life Balancing—A Better Way to Balance Large Batteries. No. 2017-01-1210. SAE Technical Paper, 2017.

(Continued)

*Primary Examiner* — Arun C Williams
(74) *Attorney, Agent, or Firm* — David B. Kelley; Brooks Kushman P.C.

(57) ABSTRACT

A vehicle includes a traction battery comprising a plurality of cells. The vehicle also includes a plurality of power converters each electrically coupled between a corresponding group of cells and an electrical bus. A controller is programmed to satisfy a current demand of the electrical bus by operating a subset of the power converters to each draw a current that exceeds a threshold corresponding to a power converter efficiency exceeding a predetermined efficiency. Power converters not assigned to the subset are operated at zero current.

17 Claims, 4 Drawing Sheets

(56) References Cited

U.S. PATENT DOCUMENTS

| | | | |
|---|---|---|---|
| 9,948,199 B2 | 4/2018 | McMorrow et al. | |
| 2002/0167291 A1* | 11/2002 | Imai | H02J 7/0018 |
| | | | 320/119 |
| 2008/0061757 A1* | 3/2008 | Khayat | H02M 3/157 |
| | | | 323/283 |
| 2009/0033274 A1 | 2/2009 | Perisic et al. | |
| 2010/0117593 A1* | 5/2010 | Piccard | H02J 7/0018 |
| | | | 320/104 |
| 2012/0105011 A1* | 5/2012 | Park | H02J 3/14 |
| | | | 320/137 |
| 2013/0030581 A1* | 1/2013 | Luke | B60L 1/003 |
| | | | 700/286 |
| 2015/0214757 A1 | 7/2015 | Zane et al. | |
| 2016/0156191 A1 | 6/2016 | Takanaka | |
| 2016/0336765 A1 | 11/2016 | Trimboli et al. | |
| 2016/0336767 A1 | 11/2016 | Zane et al. | |
| 2017/0008415 A1 | 1/2017 | Ando et al. | |
| 2017/0077806 A1* | 3/2017 | Hong | H02M 3/1584 |
| 2017/0297440 A1 | 10/2017 | Hu et al. | |
| 2018/0050597 A1 | 2/2018 | Hand, III et al. | |
| 2018/0050603 A1 | 2/2018 | Hand, III et al. | |
| 2019/0190386 A1* | 6/2019 | Cheng | H02M 3/1584 |

OTHER PUBLICATIONS

Rehman, M. Muneeb Ur, et al. "Modular approach for continuous cell-level balancing to improve performance of large battery packs." 2014 IEEE Energy Conversion Congress and Exposition (ECCE). IEEE, 2014.

Wu, Hongwei, Manuela Sechilariu, and Fabrice Locment. "Influence of Dynamic Efficiency in the DC Microgrid Power Balance." Energies 10.10 (2017): 1563.

* cited by examiner

SYSTEM AND METHOD FOR SELECTING CONVERTERS TO PASS NON-ZERO CURRENT IN DISTRIBUTED CONVERTER SYSTEM

TECHNICAL FIELD

This application generally relates to a system for powering a low-voltage bus by one or more power converters arranged in parallel.

BACKGROUND

Hybrid-electric and electric vehicles distribute energy to various components that are connected to a high-voltage electrical bus and a low-voltage electrical bus. Sources of energy include a battery that is connected to the high-voltage bus and a generator that is also connected to the high-voltage bus. The vehicles generally include a single power converter for transferring energy from the high-voltage electrical bus to the low-voltage electrical bus.

SUMMARY

A vehicle includes a traction battery comprising a plurality of cells. The vehicle further includes power converters, each electrically coupled between a corresponding group of cells and an electrical bus. The vehicle further includes a controller programmed to satisfy a current demand of the electrical bus by operating a subset of the power converters to each draw a current exceeding a threshold corresponding to a power converter efficiency exceeding a predetermined efficiency, and operating remaining power converters at zero current.

The controller may be further programmed to proportion the current demand among the power converters of the subset such that the current is equally distributed among power converters of the subset. The controller may be further programmed to proportion the current demand among the power converters of the subset according to relative values of a parameter associated with each corresponding group of cells. The parameter may be a state of charge and/or a battery power capability. The controller may be further programmed to, responsive to each of the power converters of the subset drawing the current for a time exceeding a predetermined time, reassign the power converters to the subset and proportion the current demand among the power converters of the subset according to relative values of a parameter associated with each corresponding group of cells. The controller may be further programmed to, responsive to an average state of charge of the corresponding groups of cells associated with the subset falling below a reference state of charge, reassign the power converters to the subset such that at least one of the power converters drawing current is not assigned to the subset. The reference state of charge may be a median state of charge of the cells of the traction battery. The controller may be further programmed to assign power converters having corresponding groups of battery cells with highest average cell states of charge to the subset.

A vehicle electrical system includes a plurality of power converters each electrically coupled between a group of battery cells and an electrical bus. The vehicle electrical system further includes a controller programmed to, responsive to a current demand of the electrical bus, operate a subset of the power converters such that a current input to each exceeds a threshold corresponding to an efficiency exceeding a predetermined efficiency, and operate remaining power converters at zero current.

The controller may be further programmed to proportion the current demand among the power converters of the subset such that the current is equally distributed among power converters of the subset. The controller may be further programmed to proportion the current demand among the power converters of the subset according to relative values of a state of charge associated with each corresponding group of cells. The controller may be further programmed to, responsive to each of the subset drawing the current for a time exceeding a predetermined time, reassign the power converters to the subset. The controller may be further programmed to, responsive to an average state of charge of the groups of battery cells associated with the subset falling below a reference state of charge, reassign the power converters to the subset such that at least one of the power converters drawing current is not assigned to the subset. The reference state of charge may be a median state of charge of all battery cells.

A method includes operating, by a controller, power converters electrically coupled between corresponding groups of battery cells and an electrical bus to satisfy a current demand of the electrical bus so that a first subset of the power converters draws zero current and each of a second subset of power converters draws current exceeding a threshold corresponding to an efficiency exceeding a predetermined efficiency.

The method may further include proportioning, by the controller, the current demand among the power converters of the second subset according to relative values of a parameter associated with the corresponding groups of battery cells. The method may further include reassigning, by the controller, the power converters between the first subset and the second subset responsive to the second subset drawing current for a time exceeding a predetermined time. The method may further include assigning, by the controller, power converters having corresponding groups of battery cells with the highest average cell states of charge to the second subset. The method may further include reassigning, by the controller, the power converters between the first subset and the second subset such that at least one of the power converters of the second subset is reassigned to the first subset responsive to an average state of charge of groups associated with the second subset falling a predetermined amount below a median state of charge value of all of the battery cells.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
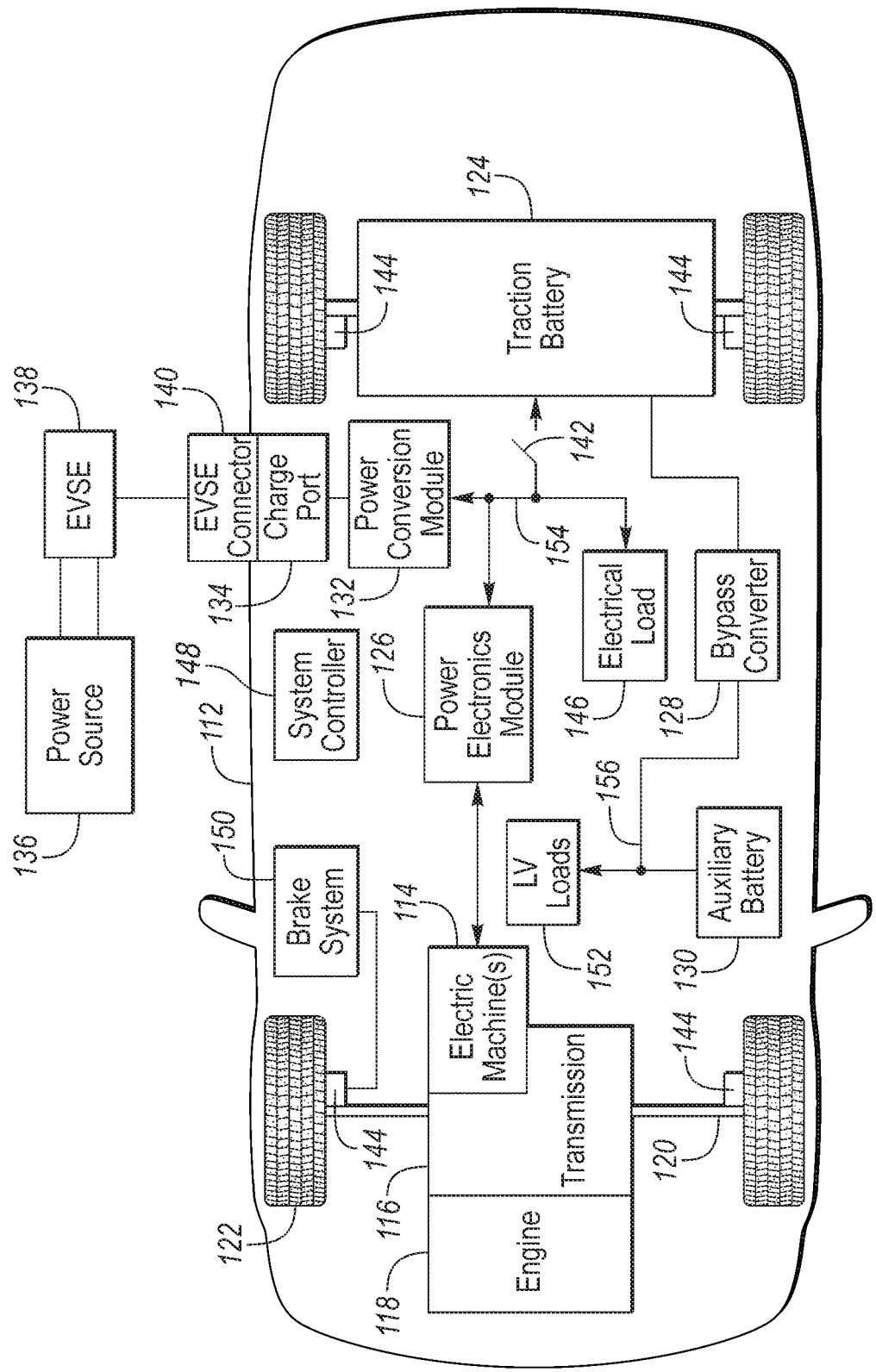
FIG. 1 is a diagram of an electrified vehicle illustrating drivetrain and energy storage components including an electric machine.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present.

A traction battery or battery pack 124 stores energy that can be used by the electric machines 114. The traction battery 124 may be electrically couplable to a high-voltage electrical bus 154. The high-voltage bus 154 may include power and return conductors. The vehicle battery pack 124 may provide a high voltage direct current (DC) output. One or more contactors 142 may isolate the traction battery 124 from the high-voltage bus 154 when opened and connect the traction battery 124 to the high-voltage bus 154 when closed. The traction battery 124 may be electrically coupled to one or more power electronics modules 126 (may also be referred to as a traction inverter). The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a bypass converter module 128 that converts the high voltage DC output of the traction battery 124 to a low voltage DC supply that is compatible with low-voltage vehicle loads 152. An output of the bypass converter module 128 may be electrically coupled to a low-voltage electrical bus 156 and to an auxiliary battery 130 (e.g., 12V battery) for charging the auxiliary battery 130. The low-voltage systems 152 may be electrically coupled to the low-voltage bus 156. The low-voltage bus 156 may include power and return conductors. One or more electrical loads 146 may be coupled to the high-voltage bus 154. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132.

The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Electrified vehicles (e.g., BEV, PHEV) distribute power via the high-voltage bus 154 and the low-voltage bus 156. Prior arrangements typically utilize a single DC/DC converter electrically coupled between the high-voltage bus 154 and the low-voltage bus 156 to provide power to the low-voltage bus 156. The DC/DC converter may be configured to reduce the voltage of the high-voltage bus 154 to a voltage level (e.g., 12V) of the low-voltage bus 156. The system described herein replaces the traditional DC/DC converter with the bypass converter module 128 to provide power to the low-voltage bus 156 and provide additional benefits to be described herein.

Figure 2:
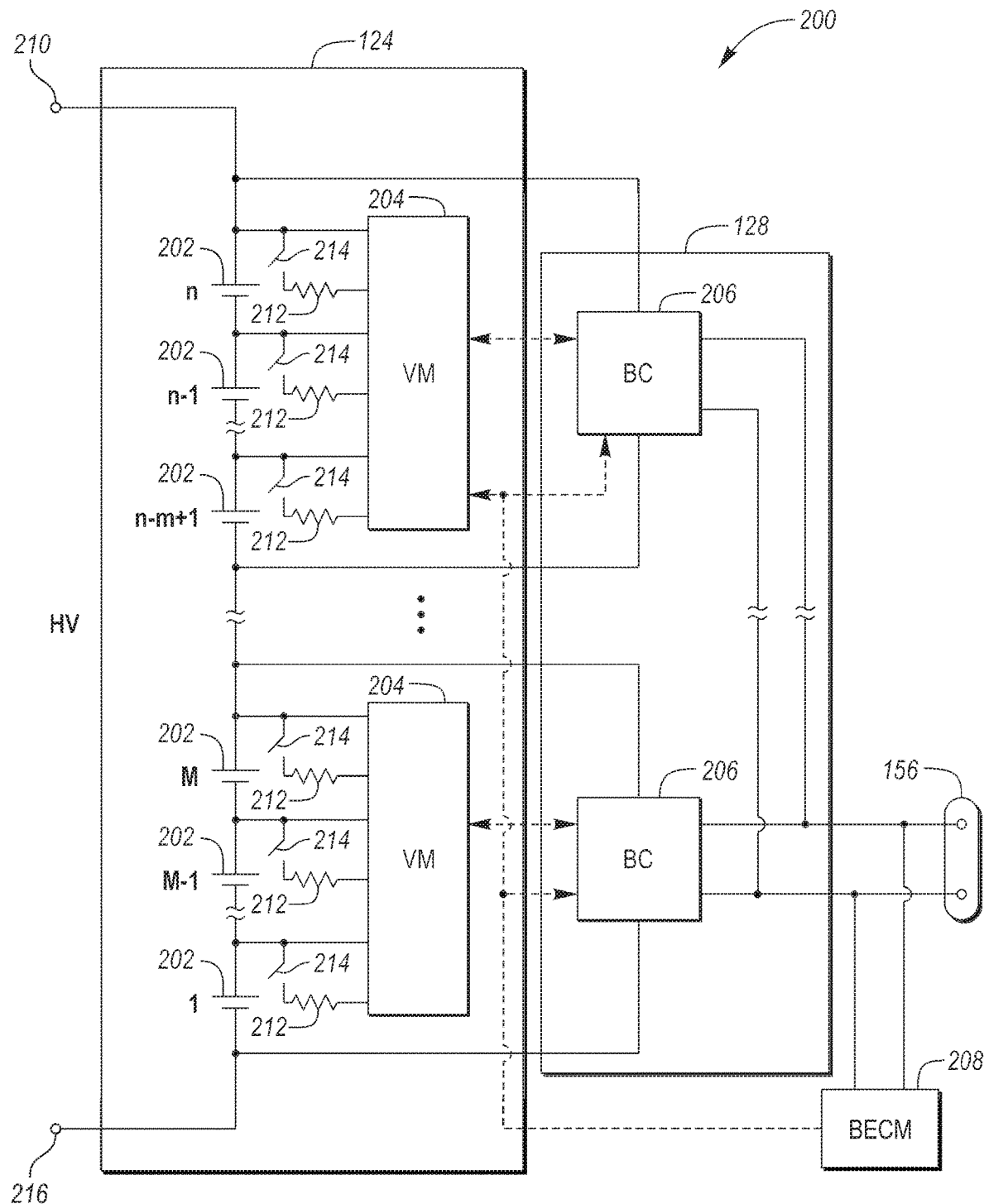
FIG. 2 is a diagram of a vehicle electrical system including bypass converters.

FIG. 2 depicts a possible configuration of a vehicle electrical system 200. The traction battery 126 may be comprised of a plurality of battery cells 202. The battery cells 202 may be constructed from a variety of chemical formulations. Typical battery pack chemistries may be lead acid, nickel-metal hydride (NIMH) or Lithium-Ion. The traction battery 124 may be comprised of a series configuration of n battery cells 202. Other configurations are possible, however, and the traction battery 124 may be composed of any number of individual battery cells 202 connected in series or parallel or some combination thereof. The system may include one or more controllers, such as a Battery Energy Control Module (BECM) 208, that are configured to monitor and control the performance of the traction battery 124. The BECM 208 may monitor several traction battery level characteristics such as pack current, pack voltage and pack temperature. The BECM 208 may include non-volatile memory such that data may be retained when the BECM 208 is in an off condition. Retained data may be available upon the next key cycle.

In addition to the pack level characteristics, there may be battery cell level characteristics that are measured and monitored. For example, the terminal voltage, current, and temperature of each of the battery cells 202 may be measured. The vehicle electrical system 200 may use one or more sensor modules 204 to measure the characteristics of the battery cells 202. The sensor modules 204 may include voltage sensors configured to measure the voltage across each of the battery cells 202. Depending on the capabilities, the sensor modules 204 may measure the characteristics of one and/or groups of the battery cells 202. The traction battery 124 may utilize multiple sensor modules 204 to measure the characteristics of all the battery cells 202. Each sensor module 204 may transfer the measurements to the BECM 208 for further processing and coordination. The sensor modules 204 may transfer signals in analog or digital form to the BECM 208. In some configurations, the sensor module 204 functionality may be incorporated internally to the BECM 208. That is, the sensor module 204 hardware may be integrated as part of the circuitry in the BECM 208 and the BECM 208 may handle the processing of raw signals.

Various characteristics of the traction battery 124 and/or battery cells 202 may be computed. Quantities such a battery power capability and battery state of charge may be useful for controlling the operation of the traction battery 124 as well as any electrical loads 146 receiving power from the traction battery 124. Battery power capability is a measure of the maximum amount of power the traction battery 124 can provide or the maximum amount of power that the traction battery 124 can receive. Each of the battery cells 202 may be characterized by a battery power capability. Knowing the battery power capability allows electrical loads 146 to be managed such that the power requested is within limits that the traction battery 124 can handle.

Battery state of charge (SOC) gives an indication of how much charge remains in the battery. The battery SOC may be output to inform the driver of how much charge remains in the traction battery 124, similar to a fuel gauge. The battery SOC may also be used to control the operation of an electrified vehicle. Calculation of battery SOC can be accomplished by a variety of methods. One possible method of calculating battery SOC is to perform an integration of the battery pack current over time. This is well-known in the art as ampere-hour integration. The SOC of each of the battery cells 202 may be computed in a similar manner.

Another feature of the traction battery 124 may be the ability to balance the battery cells 202. Balancing the battery cells 202 may be a process of charging or discharging individual battery cells 202 so that the states of charge or power capability of the battery cells 202 are equalized. This operation is useful to prevent overcharging and/or undercharging of individual battery cells. To facilitate cell balancing, the traction battery 124 and/or sensor modules 204 may include a switching element 214 and a resistor 212 coupled to each of the battery cells 202. The switching element 214 and the resistor 212 may be arranged so that the resistor 212 may be coupled in parallel with a battery cell 202 to cause current to flow from the battery cell 202 through the resistor 212. By activating the switching element 214, current may flow from the battery cell 202 through the resistor 212 to cause the cell SOC to decrease. The switching element 214 may be controllable by the sensor module 204 via a control signal. The switching element 214 may be in a normally open position. The switching element 214 may be a solid-state element (e.g., metal-oxide semiconductor field-effect transistor (MOSFET)).

The BECM 208 may be programmed to manage cell balancing. Various methods for managing cell balancing may be available. For example, cell balancing may be performed after a charging event. The SOC of each of the battery cells 202 may be compared. Battery cells 202 having a higher SOC may be discharged to match the SOC of the remaining cells by activating the associated switching element 214 to discharge current from the cell.

The bypass converter module 128 may include a plurality of DC/DC bypass converters 206 that are configured to provide an output voltage compatible with the low-voltage bus 156. The voltage outputs of the bypass converters 206 may be connected in parallel such that each of the bypass converters 206 may contribute to the current flowing through the low-voltage bus 156. The voltage input to each of the bypass converters 206 may be coupled across a predetermined number of battery cells 202. For example, the input to the bypass converters 206 may be across m battery cells 202. The m battery cells may be referred to as a group of battery cells. The voltage input to the bypass converters 206 may be the sum of the voltages across the m battery cells 202. The voltage input may also be referred to as the voltage across the group of battery cells. In addition, each group of battery cells may have an associated SOC that may be derived from the individual battery cells that make up the group. For example, the group SOC may be an average cell SOC, a lowest cell SOC of the battery cells in the group, or a highest SOC of the battery cells of the group.

Depending on the voltage input, the bypass converters 206 may be configured to increase (boost) or decrease (buck) the voltage to provide the output voltage. In some configuration, the bypass converters 206 may include a bypass mode to couple the input to the output with a high efficiency when the input and output voltage levels are similar. For example, the bypass mode may increase efficiency by avoiding switching losses within the converter. The bypass converters 206 may include an internal controller to manage the voltage conversion operation. As there are multiple bypass converters 206, the BECM 208 may manage and coordinate the operation of the bypass converters 206 to supply a total current provided to the low-voltage bus 156. For example, each of the bypass converters 206 may communicate with the BECM 208 over the vehicle network or a dedicated communication channel.

Figure 4:
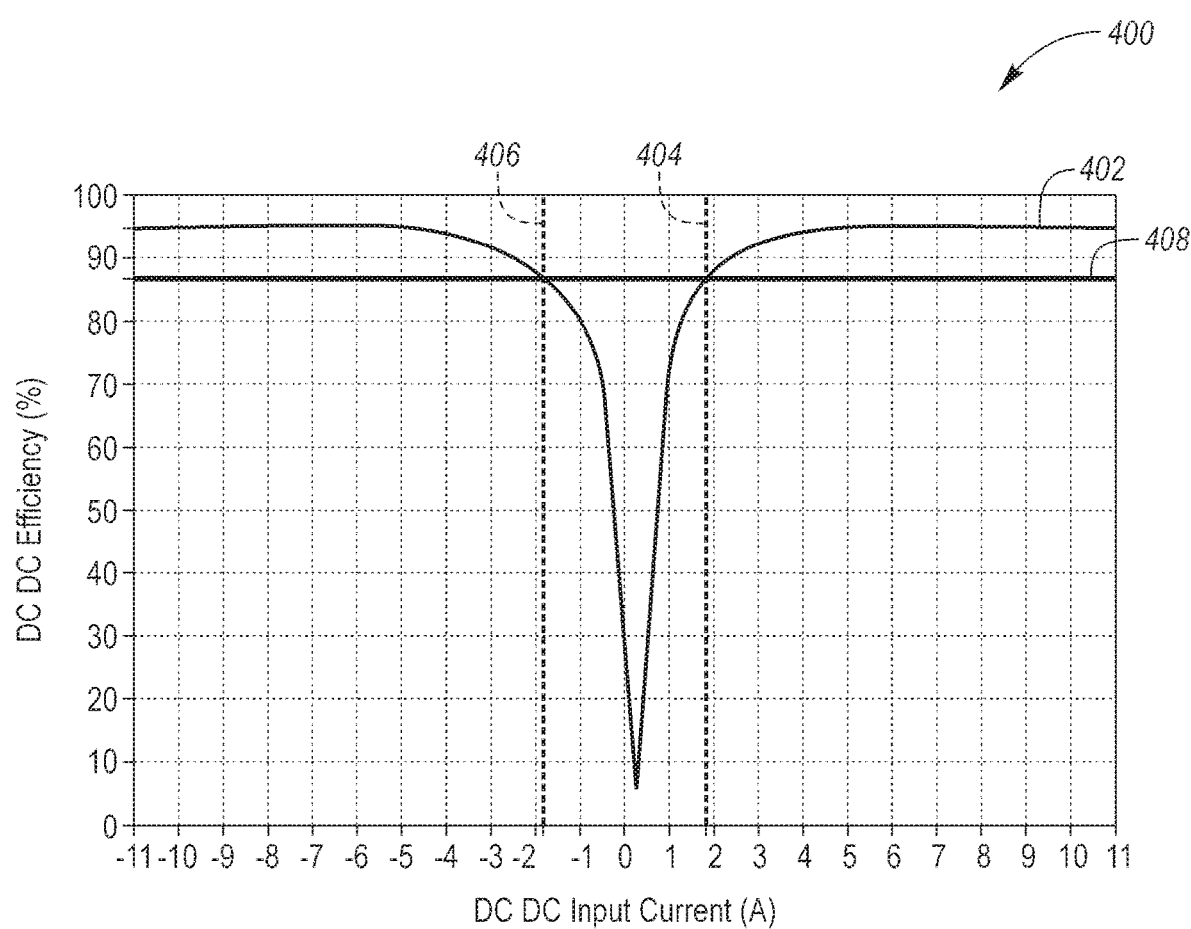
FIG. 4 is a graph of a possible converter efficiency curve with respect to converter input current.

The total current supplied from traction battery 124 to the low-voltage bus 156 may be varied with the current demanded by the LV loads 152 in order to regulate the LV bus voltage to a target voltage. The current demand on the low-voltage bus 156 may vary from a few Amperes to over hundreds of Amperes in an electrified vehicle. As such, the total current draw of bypass converter 128 varies in same range. The vehicle electrical system with a plurality of DC/DC bypass converters 206 is not only able to individually adjust the current flow through each of the bypass converters 206, but can also reduce the voltage conversion ratio between the bypass converter input and output. The ratio may be made close to one in order for the converters to work with higher converting efficiency (e.g., engaging a bypass mode of the converter). As shown in FIG. 2, the input voltage of bypass converters 206 may be determined by a predetermined number of battery cells 202, and the output voltage of converters may be determined by LV bus voltage which is nominally around 12V for a vehicle. Considering the effect of the voltage converting ratio on the converter efficiency, the ratio may be selected to be in the range of 1-2. For this ratio range, there may be 3 to 6 battery cells 202 that are serially connected on the battery or input side of the bypass converters 206. Another factor that affects converter efficiency may be the current flow through the bypass converter 206 after the ranges of input and output voltages are determined. As an example, a graph 400 of a possible efficiency curve 402 of a bypass converter 206 is shown in FIG. 4. At current magnitudes above a threshold (e.g., positive current threshold 404 and negative current threshold 406), the efficiency generally exceeds 85%. The converter efficiency becomes lower when the input current magnitude falls within the window defined between the positive current threshold 404 and the negative current threshold 406, and approaches zero as the input current magnitude approaches to zero. When viewed from an efficiency standpoint, it is desired to operate the bypass converters 206 at higher current levels (e.g., >2 A) to achieve efficiencies greater than a predetermined efficiency level 408.

When a plurality of DC/DC bypass converters 206 is used to supply power from traction battery 124 to the low-voltage bus 156 of an electrified vehicle, the number of bypass converters 206 that are used may be determined by the maximum allowed current of the bypass converters 206 and the number of battery cells 202 that are connected to the bypass converters 206 after considering the voltage conversion ratio and balance requirements. For example, if the nominal voltage of the high-voltage bus 154 is about 300V, the system may need 13-26 converters when the voltage conversion ratio is in a range of 1-2. One mode of operation may be to distribute the current load equally among the DC/DC bypass converters 206. As an example, a system may include 14 bypass converters having a conversion ratio of 2 (e.g., input/output is 2) and the converters may be operated to each provide the same level of current. In this example, the average input current of a bypass converter may be in the range between less than 0.5 A to greater than 7 A when current loads of the low-voltage bus 156 that are connected to the output of the bypass converters varies in the range of 10 A to 200 A. When distributing the current equally, the converter efficiency may be below 75% when the low-voltage bus 156 current load is less than about 30 A. The efficiency may fall below 50% if the low-voltage bus 156 current load is less than about 15 A. Lower working efficiency of the converters not only affects equivalent fuel economics of vehicle, but also results in higher heat generation.

Better results may be achieved by distributed operation of the bypass converters 206 such that each of the converters is operated in a high efficiency region. In this mode of operation, the current load may be distributed unequally between the DC/DC bypass converters 206. The solution includes selecting the number of bypass converters passing non-zero current to ensure that the input currents of the bypass converters 206 are within the high efficiency region (e.g., efficiency greater than 90%). Using this strategy, some of the bypass converters 206 may be operated at zero current. That is, some of the bypass converters 206 may be inactive and not passing current. It can be recognized that when the bypass converters 206 are providing different currents that the battery cells 202 may be providing different currents that may result in battery cell imbalances. The general operating strategy may be to distribute the current among a subset of the bypass converters 206, while operating the remaining bypass converters at zero current. The bypass converters 206 that are included in the subset may be commanded to pass a current that causes the converter efficiency to be greater than a predetermined threshold.

The SOC of the battery cells or groups of battery cells may be considered when selecting the bypass converter current levels. The SOC differences between the groups of battery cells may be used to adjust a proportion of current distributed to each of the bypass converters 206. Considering the SOC differences may decrease divergence of the battery SOC from a reference SOC.

The bypass converters that are providing current (e.g., the subset) may be periodically reselected after passing current for a predetermined time or when the associated SOC has changed relative to a reference SOC. The bypass converters 206 may be reassigned to the subset of converters that are providing current such that at least one of the bypass converters that was providing current is commanded to zero current. By periodically reassigning the bypass converters 206 to the subset, the battery cells may remain with a narrow range of being in balance.

Each of the bypass converters 206 may be operated to provide current to the low-voltage bus 156. Current demand on the low-voltage bus 156 may be satisfied by operation of the bypass converters 206. As there are multiple bypass converters 206 the current may be distributed or proportioned among each of the bypass converters 206. There may be $N_c$ converters with each assigned an integer index in the range of 1 to $N_c$. The BECM 208 may manage the total current provided to the low-voltage bus 156 by the bypass converters 206. The BECM 208 may be programmed to distribute a portion of the total current to each of the bypass converters 206. The BECM 208 may implement a current distribution function. The current distribution function may distribute the total current to the individual bypass converters 206 based on the state of charge of the battery cells 202 (cell unit) associated with each of the bypass converters 206.

The bypass converters 206 may be in communication with an associated sensor module 204. For example, the bypass converters 206 and the sensor modules 204 may be connected to a serial peripheral interface (SPI) bus. The SPI bus may be a dedicated communication link between the bypass converter 206 and associated sensor module 204.

The BECM 208 may be in communication with the sensor modules 204 and the bypass converters 206. For example, the BECM 208 and the sensor modules 204 via a CAN communication channel. In some configurations, the communication between the BECM 208 and the bypass converters 206 may be indirect and pass through the sensor modules 204. For example, the BECM 208 may communicate via the CAN communication channel to the sensor modules 204. The sensor modules 204 may then transfer messages for the bypass converters 206 to the SPI bus.

The bypass converters 206 may include one or more current sensors to measure the input and/or output current of the bypass converter 206. The current measurement may be used for control of the conversion operation. In addition, the current measurement values may be communicated to the BECM 208. The bypass converters 206 or associated sensor modules 204 may include one or more voltage sensors to measure the input and/or output voltage of the bypass converter 206. In some configurations, the output voltage may be measured by the BECM 208 and the output voltage value may be communicated to the bypass converters 206. In some configurations, the sensor module 204 may measure or calculate the voltage across the group of battery cells 202 and communicate the value to the bypass converters 206 as the input voltage.

The BECM 208 may be programmed to implement a strategy for allocating or proportioning the current among the bypass converters 206. When the current demand of the low-voltage bus is high, the current may be proportioned equally between the bypass converters 206. Each of the bypass converters 206 may operate with a current greater than the current limit resulting in operation above the selected limit of efficiency. When the current demand of the low-voltage bus 156 is low, the current may be proportioned unequally between the bypass converters 206. In this situation, equally distributing the total current could result in the bypass converters operating at a current below the current limit for desired efficiency. The solution may be to operate some of the bypass converters 206 at a zero-current level. This way, the current may be redistributed to increase the current provided by the remaining converters such that the current is above the current limit. This can improve the overall efficiency of the system. As an example, at low current levels the current could be allocated to one of the bypass converters 206 that is operated in the high-efficiency region. Over time, the current may be reallocated to another one of the bypass converters 206 in order to balance the usage of the battery cells 202.

Figure 3:
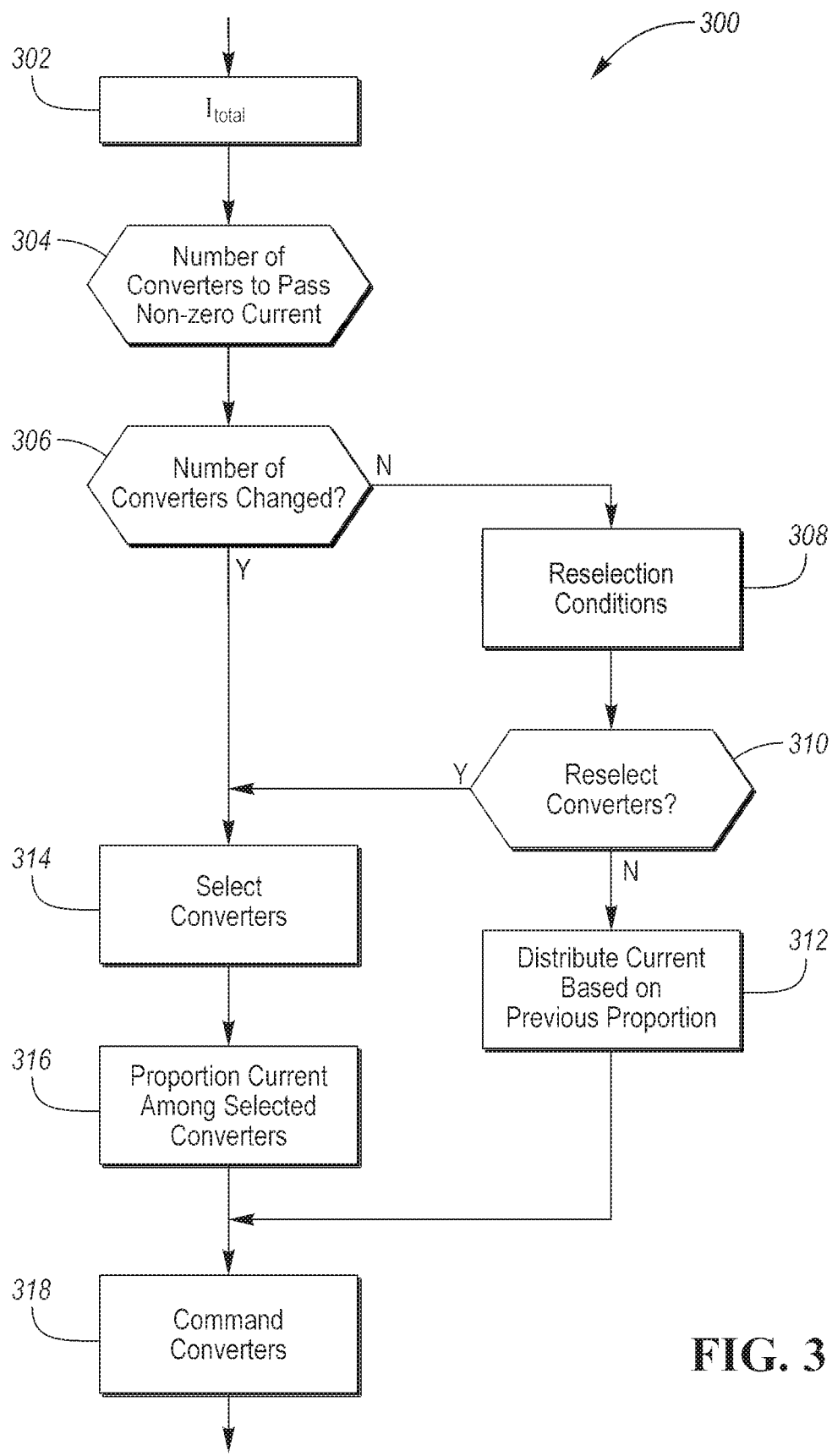
FIG. 3 is a flowchart for a possible sequence of operations for operating the bypass converters to satisfy current demand on an electrical bus.

FIG. 3 depicts a flowchart 300 for a possible sequence of operations for proportioning current to the bypass converters 206. The operations may be implemented in one or more controllers such as the BECM 208. At operation 302, the BECM 208 may implement a total current control function to determine the total current that is to be provided to the low-voltage bus 156. The BECM 208 may regulate a voltage of the low-voltage bus 156 and determine the total current flow to be provided by the bypass converters 206. The current may be positive when supplied from the traction battery 124 to the low-voltage bus 156. The current may be negative otherwise.

The total current control function may input a voltage error between a desired LV bus voltage and an actual LV bus voltage. The total current control function may also input a desired current for the low-voltage bus 156. The total current control function may determine a total LV bus current to reduce the voltage error.

The relationship between the converter efficiency and the converter input current may be known for the bypass converters 206. From this relationship, the minimum magnitude of the input current (e.g., 404, 406 of FIG. 4) to achieve an efficiency above a predetermined value (e.g., 408 of FIG. 4) can be determined. The predetermined value may be based on vehicle performance requirements. A limit of efficiency (e.g., 408 of FIG. 4) may be selected as a preferred operating point. When the limit of efficiency is selected, the current limits may be determined.

At operation 304, the BECM 208 may be programmed to determine the number of bypass converters commanded to pass non-zero current. The number of bypass converters that may be commanded to output non-zero current ($n_{nz}$) may be computed as:

$$n_{nz} = \frac{I_{total}}{kI_{limit}} \quad (1)$$

where $I_{total}$ is the current demand for the low-voltage bus, $I_{limit}$ is the minimum current magnitude to achieve a predetermined efficiency (e.g., 404, 406 of FIG. 4), and k is a parameter. The parameter k may be selected to satisfy the following:

$$1 < k < 0.5 \frac{I_{max}}{I_{limit}} \quad (2)$$

where $I_{max}$ is a maximum allowed current for the bypass converters. The value of $n_{nz}$ may be limited to be a value between 1 and $N_c$ to ensure that at least one converter and no more than the available converters are selected.

When $I_{total}/(kI_{limit}) < N_c$, only a subset of the $N_c$ bypass converters 206 are selected to pass non-zero current to guarantee that the input current of selected bypass converters falls within the higher-efficiency operating region.

The BECM 208 may periodically check to determine if the number of active converters, $n_{nz}$, should be recalculated. At operation 306, the BECM 208 may be programmed to check if the number of non-zero current carrying bypass converters has changed. If the number of converters has changed, then operation 314 may be performed to select the converters. Selecting the converters may determine which of the bypass converters 206 are assigned to the subset of non-zero current suppliers. For example, if the value of $n_{nz}$ at a present time, t, is different than the value used in the previous time step, t−1, then the controller may reselect the converters and re-determine which of the bypass converters will be allowed to pass non-zero current.

At operation 314, the BECM 208 may be programmed to select the bypass converters that are to be commanded with non-zero current. The BECM 208 may compare battery parameters associated with each group of battery cells. The battery parameters that are used for determining the active bypass converters may be a battery cell SOC, power capability, health condition, or other battery property. The value of the parameter may be an average, a mid-point, a maximum, or a minimum value of the battery parameter when more than one battery cell is used. For example, the average SOC of the group of battery cells may be used. In this example, the $n_{nz}$ bypass converters associated with battery cells having the highest average SOC may be selected to distribute the current.

At operation 316, the BECM 208 may be programmed to distribute or proportion the total current among the selected bypass converters. After the differences between the battery parameters associated with the selected converters are calculated, the current distributing ratios for the selected bypass converters may be calculated based on the differences. In some configurations, the current demand may be equally distributed among the selected converters. In some configurations, the current demand may be proportioned among the power converters according to relative values of one or more parameters associated with corresponding groups of battery cells. For example, the bypass converters connected with battery cells that have higher SOC levels may be assigned a higher distribution proportion leading to a higher distribution current. The sum of the distribution proportions for all the selected bypass converters is 1 and the sum of the distributed currents for all the selected converters may be $I_{total}$. The proportion of the total load current distributed to each of the bypass converters 206 of the active subset may be configured to equalize the battery parameters (e.g., SOC) over a predetermined time interval. For example, each group of battery cells may be expected to have the same SOC after providing the distributed current over the predetermined time interval.

At operation 318, the BECM 208 may be programmed to command the bypass converters with the allocated current distribution. The BECM 208 may send control signals indicative of the distributed current to each of the bypass converters. The control signals may include a current magnitude and direction of current flow. The distributed current may be a positive value to indicate a flow of current from the battery cells 202 to the low-voltage bus 156 or a negative value to indicate a flow of current from the low-voltage bus 156 to the battery cells 202. Each of the bypass converters 206 may be operated to achieve the commanded current level.

The proportion of current may be implemented as a current distribution function that is programmed to output a current command to each of the bypass converters 206. The current distribution function may distribute or allocate a portion of the total current to each of the bypass converters 206. The allocated currents are not necessarily equal to one another. Further, the current distribution function may determine that some of the bypass converters 206 should not pass any current (e.g., zero current).

If the number of bypass converters has not changed, operation 308 may be performed. At operation 308, the BECM 208 may be programmed to update the reselection conditions. The battery cell parameters that are used for determining the active converters may be a battery cell SOC, power capability, health condition or other battery property. The value of the parameters may be an average, a mid-point, a maximum, or a minimum value of the battery cell properties when more than one battery cell is used. Current commands to the bypass converters 206 may trigger updates to the SOC of the group of battery cells connected to the bypass converter. As each of the bypass converters may be commanded to a different current, the SOC change may be different for each of the groups of battery cells. For each group of battery cells, a midpoint value of SOC of the individual battery cells may be computed. In addition, a maximum SOC and a minimum SOC for each group of battery cells may be computed. The SOC for each of the battery cells and/or each group of battery cells may be computed.

The SOC difference among the group of battery cells associated with the battery converters may also be changed according to the commanded currents. The SOC difference may be gradually reduced and approach zero (e.g., cells are balanced) when the system is operating. To ensure that the distributed currents have enough time to decrease the battery cell SOC imbalance, the bypass converters selected to pass non-zero current and the distribution proportions for these converters may not be changed at every time step if the value of $n_{nz}$ is not changed. The reselection conditions may include expiration of a predetermined time interval. For example, the present current distribution may be applied for the predetermined time interval. The condition for reselecting the converters may include an average SOC of the battery cells associated with the selected bypass converters becoming less than a median SOC of all the battery cells in the traction battery.

At operation 310, the BECM 208 may be programmed to check the conditions for reselecting the bypass converters. If the conditions are not satisfied, operation 312 may be performed. At operation 312, the system may distribute the current to the bypass converters based on the previous proportions. If the conditions are satisfied, operation 314 may be performed to reselect the bypass converters 206. The conditions for reselecting the bypass converters 206 to pass non-zero current may include comparing the relative change of a measure of SOC for the selected bypass converters respective battery cell group, such as average SOC, with the same or another measure of SOC for all converters respective cell units, such as an SOC midpoint, when the SOC of the battery cells or groups are not balanced. For example, reassignment of the converters may be responsive to an average state of charge of the corresponding groups of cells associated with each of the converters supplying power falling below a reference state of charge. The reference state of charge may be a predetermined amount below a median state of charge value of all of the battery cells. The reassignment may be such that at least one of the power converters drawing current is reassigned to the set that is not supplying current. The condition for reselecting the bypass converters may also be determined by an accumulated time exceeding a predetermined time limit (accum_t>time_limit), when the battery cells or groups coupled to the bypass converters 206 are balanced. The predetermined time limit may be a calibratable parameter. The reselection decision may also check that there is no significant cell SOC change during the time period.

The operating strategy disclosed improves overall efficiency of the system as the bypass converters are operated at higher levels of efficiency. In addition, the strategy provides opportunities for balancing the battery cells during vehicle operation.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
 a traction battery comprising a plurality of cells;
 power converters, each electrically coupled between a corresponding group of cells and an electrical bus; and
 a controller programmed to
  satisfy a current demand of the electrical bus by operating a subset of the power converters to each draw a current exceeding a threshold corresponding to a power converter efficiency exceeding a predetermined efficiency, and operating remaining power converters at zero current, and
  responsive to each of the power converters of the subset drawing the current for a time exceeding a predetermined time, reassign the power converters to the subset and proportion the current demand among the power converters of the subset according to relative values of a parameter associated with each corresponding group of cells.

2. The vehicle of claim 1 wherein the controller is further programmed to proportion the current demand among the power converters of the subset such that the current is equally distributed among power converters of the subset.

3. The vehicle of claim 1 wherein the controller is further programmed to proportion the current demand among the power converters of the subset according to relative values of a parameter associated with each corresponding group of cells.

4. The vehicle of claim 3 wherein the parameter is a state of charge.

5. The vehicle of claim 3 wherein the parameter is a battery power capability.

6. The vehicle of claim 1 wherein the controller is further programmed to, responsive to an average state of charge of the corresponding groups of cells associated with the subset falling below a reference state of charge, reassign the power converters to the subset such that at least one of the power converters drawing current is not assigned to the subset.

7. The vehicle of claim 6 wherein the reference state of charge is a median state of charge of the cells of the traction battery.

8. The vehicle of claim 1 wherein the controller is further programmed to assign power converters having corresponding groups of battery cells with highest average cell states of charge to the subset.

9. A vehicle electrical system comprising:
 a plurality of power converters each electrically coupled between a group of battery cells and an electrical bus; and
 a controller programmed to
  responsive to a current demand of the electrical bus, operate a subset of the power converters such that a current input to each exceeds a threshold corresponding to an efficiency exceeding a predetermined efficiency, and operate remaining power converters at zero current, and
  responsive to each of the subset drawing the current for a time exceeding a predetermined time, reassign the power converters to the subset.

10. The vehicle electrical system of claim 9 wherein the controller is further programmed to proportion the current demand among the power converters of the subset such that the current is equally distributed among power converters of the subset.

11. The vehicle electrical system of claim 9 wherein the controller is further programmed to proportion the current demand among the power converters of the subset according to relative values of a state of charge associated with each corresponding group of cells.

12. The vehicle electrical system of claim 9 wherein the controller is further programmed to, responsive to an average state of charge of the groups of battery cells associated with the subset falling below a reference state of charge, reassign the power converters to the subset such that at least one of the power converters drawing current is not assigned to the subset.

13. The vehicle electrical system of claim 12 wherein the reference state of charge is a median state of charge of all battery cells.

14. A method comprising:
operating, by a controller, power converters electrically coupled between corresponding groups of battery cells and an electrical bus to satisfy a current demand of the electrical bus so that a first subset of the power converters draws zero current and each of a second subset of power converters draws current exceeding a threshold corresponding to an efficiency exceeding a predetermined efficiency; and
reassigning by the controller, the power converters between the first subset and the second subset responsive to the second subset drawing current for a time exceeding a predetermined time.

15. The method of claim 14 further comprising proportioning, by the controller, the current demand among the power converters of the second subset according to relative values of a parameter associated with the corresponding groups of battery cells.

16. The method of claim 14 further comprising assigning, by the controller, power converters having corresponding groups of battery cells with the highest average cell states of charge to the second subset.

17. The method of claim 14 further comprising reassigning, by the controller, the power converters between the first subset and the second subset such that at least one of the power converters of the second subset is reassigned to the first subset responsive to an average state of charge of groups associated with the second subset falling a predetermined amount below a median state of charge value of all of the battery cells.

* * * * *